United States Patent
Phillips

(10) Patent No.: US 11,764,552 B2
(45) Date of Patent: *Sep. 19, 2023

(54) ELECTRICAL PANEL WITH DISTRIBUTED ENERGY RESOURCES COMPARTMENT AND PRE-WIRING FOR SOLAR INVERTER CONNECTION

(71) Applicant: Schneider Electric USA, Inc., Andover, MA (US)

(72) Inventor: Timothy Phillips, Murfreesboro, TN (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,871

(22) Filed: Jun. 3, 2022

(65) Prior Publication Data

US 2022/0302686 A1 Sep. 22, 2022

Related U.S. Application Data

(63) Continuation of application No. 17/169,714, filed on Feb. 8, 2021, now Pat. No. 11,355,903.

(51) Int. Cl.
*H02B 1/20* (2006.01)
*H02S 40/38* (2014.01)
*H02S 40/32* (2014.01)

(52) U.S. Cl.
CPC ............... *H02B 1/20* (2013.01); *H02S 40/32* (2014.12); *H02S 40/38* (2014.12)

(58) Field of Classification Search
CPC ............ H02B 1/20; H02S 40/32; H02S 40/38
See application file for complete search history.

(56) References Cited

U.S. PATENT DOCUMENTS

| | | | |
|---|---|---|---|
| 8,373,303 B1 | 2/2013 | Daniels et al. | |
| 10,944,268 B1 | 3/2021 | Lowchareonkul | |
| 11,355,903 B1 * | 6/2022 | Phillips | ................. H02B 1/202 |
| 2020/0259336 A1 | 8/2020 | Rao et al. | |
| 2021/0083621 A1 | 3/2021 | Allen | |
| 2021/0091556 A1 | 3/2021 | Pursifull | |

* cited by examiner

*Primary Examiner* — Jared Fureman
*Assistant Examiner* — Duc M Pham
(74) *Attorney, Agent, or Firm* — Locke Lord LLP

(57) ABSTRACT

A distributed energy resources compartment for an electrical panel is pre-wired for installation of a photovoltaic system for a residence. The compartment is mounted on a back plate in the interior of an electrical cabinet. A pre-wired connection within the compartment is configured to connect to a solar circuit breaker within the electrical cabinet, connected as a back-feed circuit breaker to an electrical panel. An opening on a backside of the compartment adjacent to the back plate of the electrical cabinet, is configured to receive connections within the compartment from a solar inverter, through the back plate of the electrical cabinet when the solar inverter is mounted to the back plate of the electrical cabinet.

14 Claims, 10 Drawing Sheets

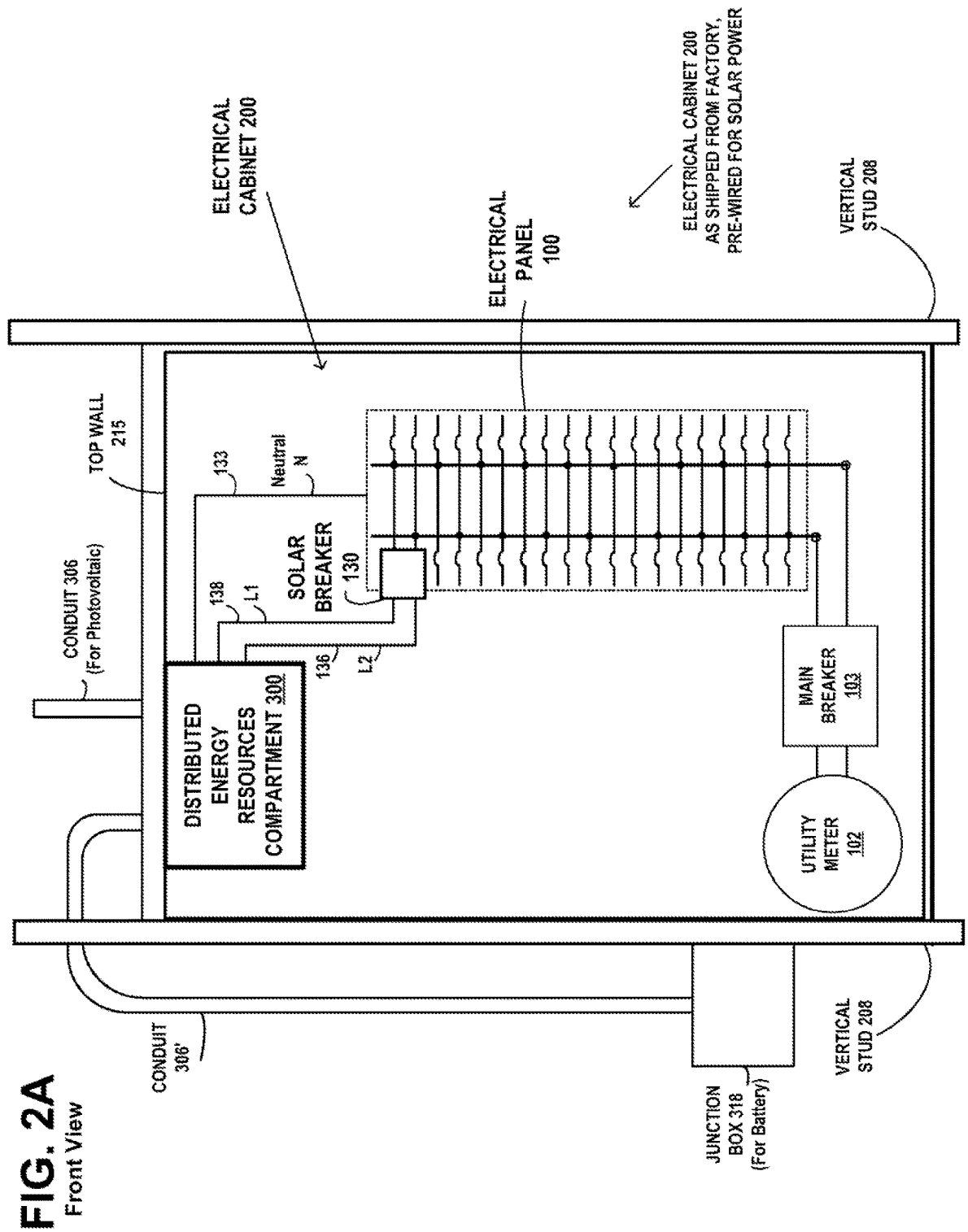

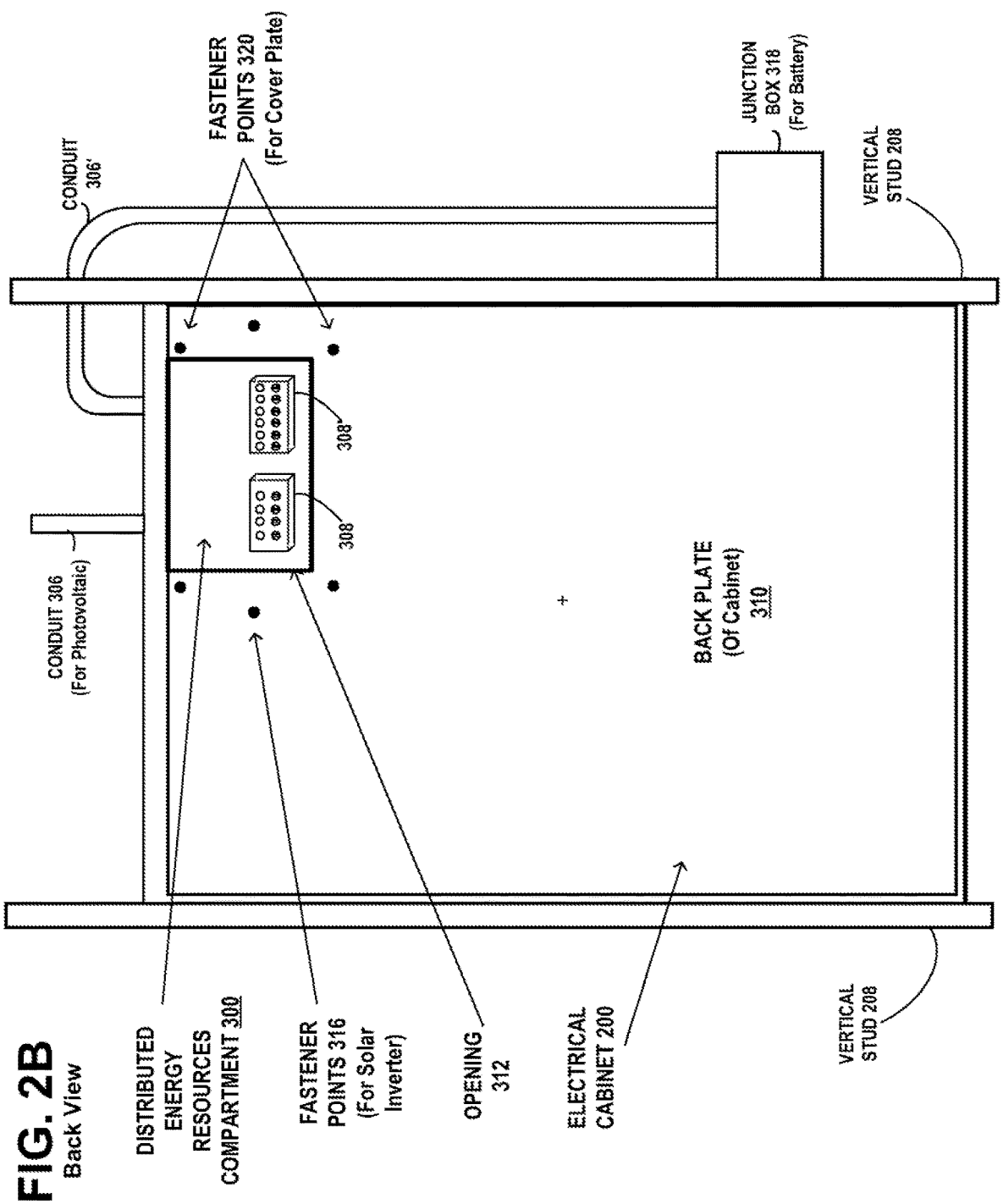

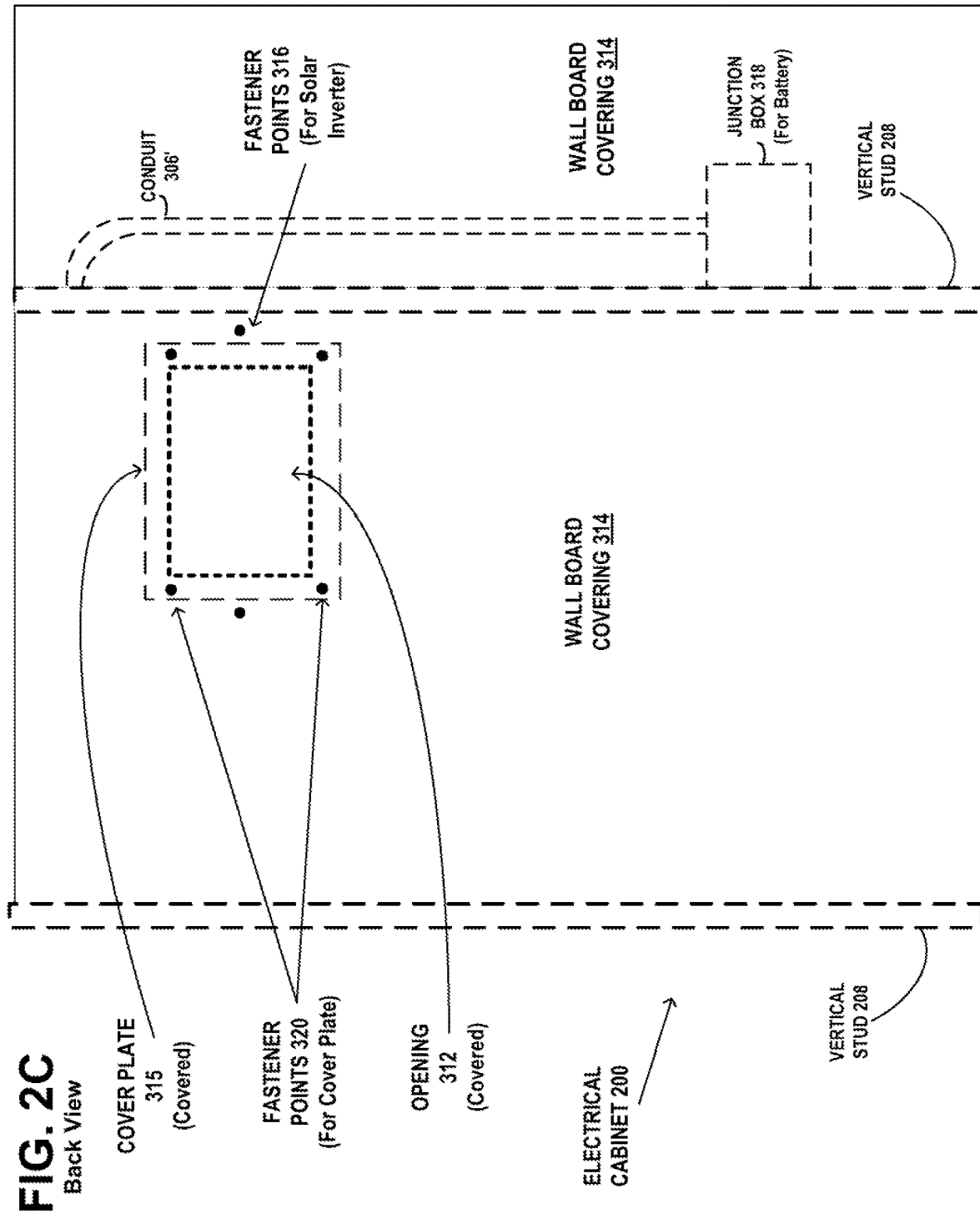
FIG. 2C Back View

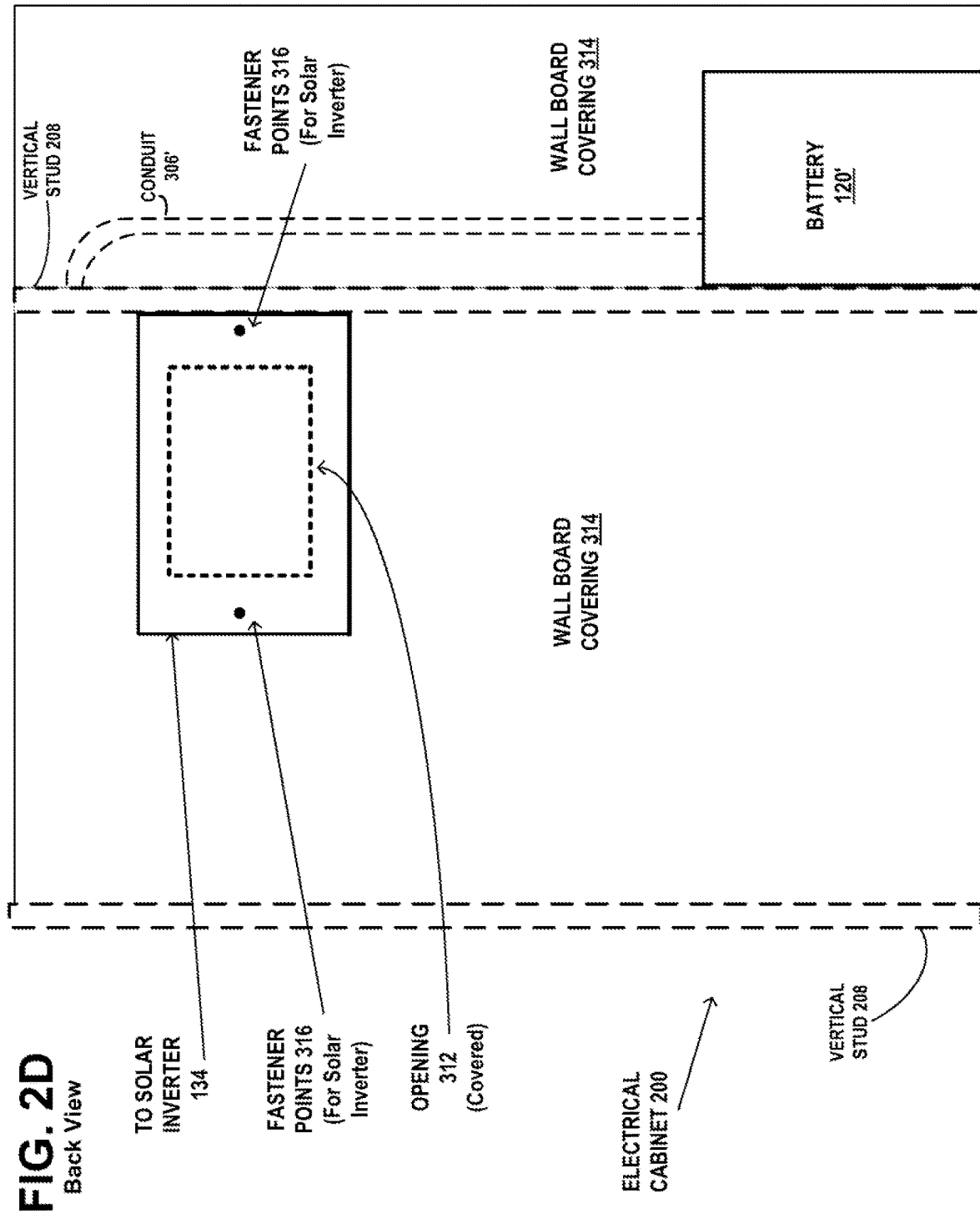

Side View

Back View

Back View

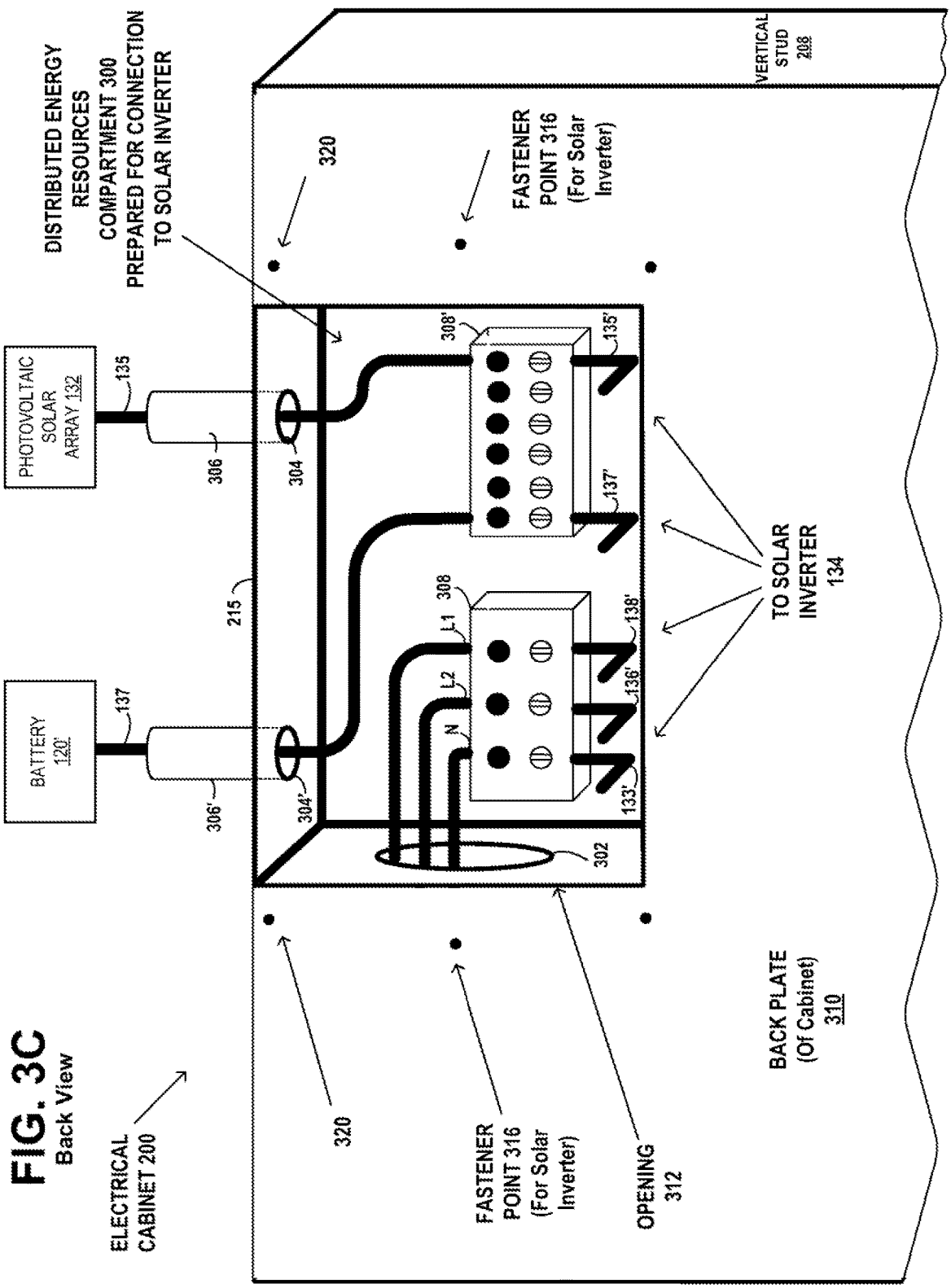

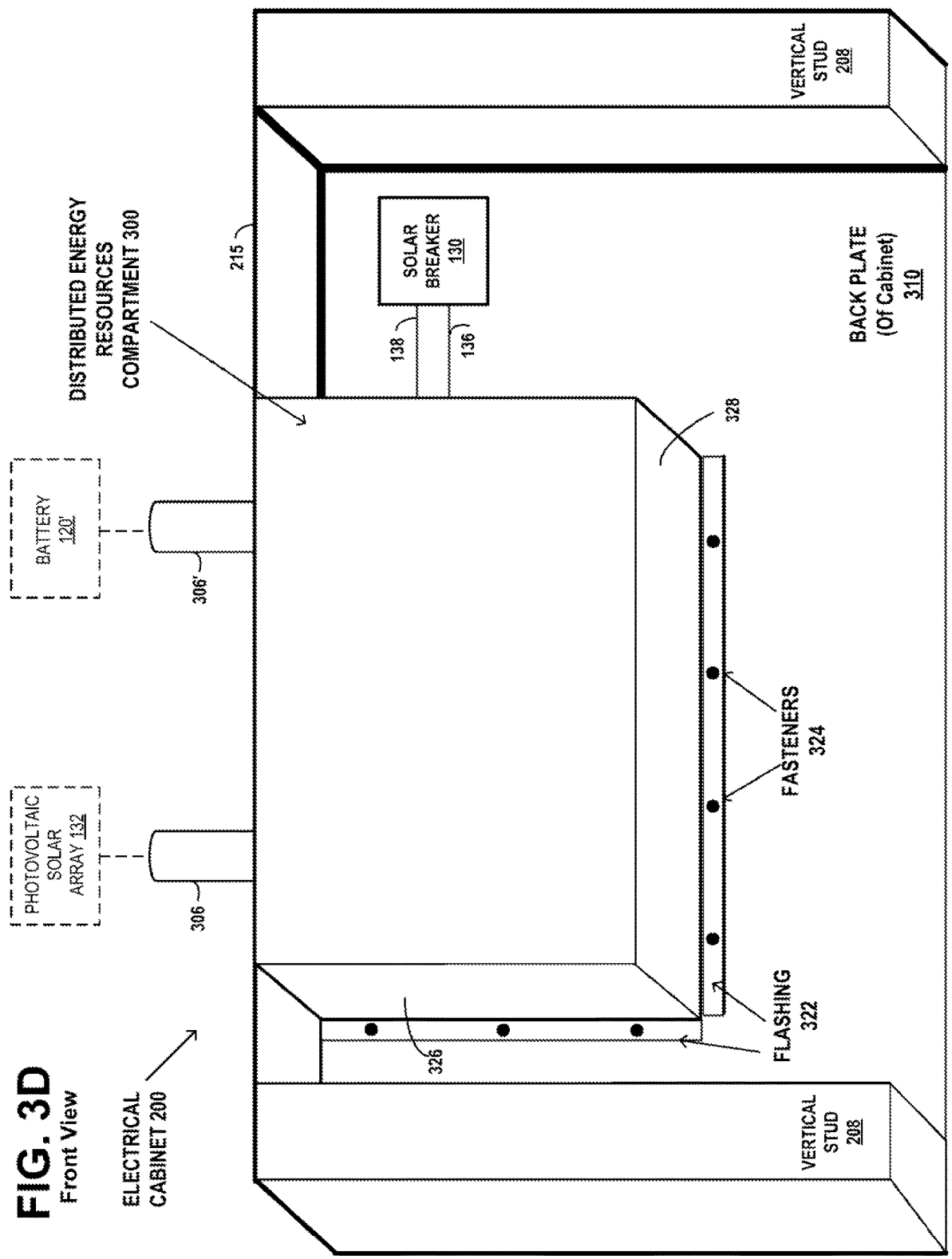

ELECTRICAL PANEL WITH DISTRIBUTED ENERGY RESOURCES COMPARTMENT AND PRE-WIRING FOR SOLAR INVERTER CONNECTION

CROSS REFERENCE TO RELATED APPLICATION

This application is a continuation of U.S. patent application Ser. No. 17/169,714, filed on Feb. 8, 2021, the entire contents of which are incorporated by reference herein in their entirety.

TECHNICAL FIELD

The present disclosure relates to a system for facilitating connecting and integrating a photovoltaic power system in a home.

BACKGROUND

Traditionally, solar inverters are an afterthought for electrical panel manufacturers. The current state of the art "solar ready" panel is one where the only adaptation is the marking of the maximum size and proper location for the solar back-feed breaker. With traditional electrical panels, the solar installer is required to obtain a correctly sized breaker and wire between the solar inverter and this breaker, usually through exposed conduit. This work is very time consuming.

What is needed is an electrical panel adapted to make it easy to connect and integrate solar energy into a residential home.

SUMMARY

In accordance with one example embodiment described herein, an apparatus provides an electrical panel adapted to make it easy to connect and integrate solar energy into a home. A distributed energy resources compartment for the electrical panel is pre-wired for installation of a photovoltaic system for a residence. The compartment is mounted on a back plate in the interior of an electrical cabinet. A pre-wired connection within the compartment is configured to connect to a solar circuit breaker within the electrical cabinet, connected as a back-feed circuit breaker to the electrical panel. An opening on a backside of the compartment adjacent to the back plate of the electrical cabinet, is configured to receive connectors within the compartment from a solar inverter, through an opening in the back plate of the electrical cabinet when the solar inverter is mounted over the back plate of the electrical cabinet.

The compartment is open on its topside adjacent to a horizontal top wall of the electrical cabinet and aligned with knockout portions in the top wall of the electrical cabinet, which mechanically connect to conduits to provide electrical connections within the compartment to a photovoltaic power source and a battery. These conduits may be run invisibly through the walls during construction, to the roof area for routing photovoltaic cables, and invisibly through the wall to an electrical box mounted conveniently nearby to the electrical cabinet for future routing of wires to a battery. The back of the electrical cabinet incorporates fastening points to allow mounting of a photovoltaic or solar inverter that may take advantage of the convenient location in the compartment to wire the required AC and DC cables to connect it. The electrical cabinet is designed to be installed in an outside wall of a garage, whereas the mounting location for the solar inverter may be positioned on the inside of the garage wall. The electrical cabinet is pre-wired to make the AC electrical connections between the inverter and the electrical panel.

In accordance with one example embodiment described herein, a distributed energy resources compartment for an electrical panel pre-wired for installation of a photovoltaic system for a residence, comprises:

a compartment mounted on a back plate of an electrical cabinet within an interior volume of the electrical cabinet;

a pre-wired connection in the compartment, configured to be connected within the compartment to a solar circuit breaker mounted within the electrical cabinet, connected as a back-feed circuit breaker to an electrical panel; and an opening on a backside of the compartment adjacent to the back plate of the electrical cabinet and aligned with an opening in the back plate of the electrical cabinet, configured to receive connections within the compartment from a solar inverter, through the opening in the back plate of the electrical cabinet, when the solar inverter is mounted to the back plate of the electrical cabinet.

In accordance with one example embodiment described herein, the distributed energy resources compartment further comprises:

the compartment having an opening on a topside thereof adjacent to a horizontal top wall of the electrical cabinet and aligned with knockout portions in the top wall of the electrical cabinet, which include at least first and second knockout portions configured to mechanically connect to respective first and second conduits to provide electrical connections within the compartment through the opening on the topside of the compartment to a respective photovoltaic power source and a battery.

In accordance with an alternate example embodiment described herein, the distributed energy resources compartment further comprises:

a terminal block mounted in the compartment, pre-wired to the electrical panel and configured to make connections with the solar inverter, to conduct AC power between the solar inverter and the electrical panel.

In accordance with an alternate example embodiment described herein, the distributed energy resources compartment further comprises:

a second terminal block mounted in the compartment, configured to make connections with the solar inverter, to conduct DC power between the solar inverter, a photovoltaic power source, and a battery.

In accordance with an alternate example embodiment described herein, the distributed energy resources compartment further comprises:

the compartment being formed as an integral part of the electrical cabinet, having a top wall of the compartment comprising part of a top wall of the electrical cabinet, including at least first and second knockout portions configured to mechanically connect to respective first and second conduits to provide electrical connections within the distributed energy resources compartment to a respective photovoltaic power source and a battery.

In accordance with an alternate example embodiment described herein, the distributed energy resources compartment further comprises:

the compartment being formed as an integral part of the electrical cabinet, with the opening on the backside of the compartment forming the opening on the back plate of the electrical cabinet, configured to receive the connections from a solar inverter through the opening on the backside of the distributed energy resources compartment.

In accordance with an alternate example embodiment described herein, the distributed energy resources compartment further comprises:

a top wall of the compartment parallel with a top wall of the electrical cabinet, including at least first and second knockout portions configured to mechanically connect to respective first and second conduits to provide electrical connections within the compartment to a respective photovoltaic power source and a battery.

In accordance with one example embodiment described herein, an apparatus for an electrical panel pre-wired for installation of a photovoltaic system for a residence, comprises:

an electrical cabinet having an interior volume, configured to fit between two adjacent vertical studs separated by a horizontal width in a vertical wall of a residential structure, the cabinet having a front side with an access door configured to extend beyond an exterior surface of the residential structure, a top side with a horizontal top wall, and a back side with a back plate facing toward an interior of the residential structure, the back plate including an open portion, the back plate configured to be covered by an interior wall covering of the residential structure;

an electrical panel mounted within the electrical cabinet, configured to be powered by a utility power source, by a solar inverter, or by a combination of the utility power source and the solar inverter;

a solar circuit breaker mounted within the electrical cabinet, connected as a back-feed circuit breaker to the electrical panel; and a distributed energy resources compartment mounted on the back plate of the electrical cabinet within the interior volume of the electrical cabinet and pre-wired to connect to the solar circuit breaker, the distributed energy resources compartment being open on a backside thereof adjacent to the back plate of the electrical cabinet and aligned with the open portion of the back plate of the electrical cabinet, the distributed energy resources compartment configured to receive connections from the solar inverter through the open portion of the back plate of the electrical cabinet when the solar inverter is mounted on the interior wall covering of the residential structure, to provide to the residence photovoltaic power via the distributed energy resources compartment, the solar circuit breaker, and the electrical panel.

In accordance with one example embodiment described herein, an apparatus for an electrical panel pre-wired for installation of a photovoltaic system for a residence, comprises:

the distributed energy resources compartment being open on a topside thereof adjacent to the horizontal top wall of the electrical cabinet and aligned with knockout portions in the top wall of the electrical cabinet, which include at least first and second knockout portions configured to mechanically connect to respective first and second conduits to provide electrical connections within the distributed energy resources compartment, through the open topside of the distributed energy resources compartment to a respective photovoltaic power source and a battery.

When the electrical cabinet is to be installed with a photovoltaic system, a solar inverter is connected to the back section, facing away from the front of the electrical cabinet. The connections are made by routing wiring through the distributed energy resources compartment. The electrical cabinet is designed to be installed in the outside wall of a garage, whereas the mounting location for the solar inverter is located on the inside of the garage wall. The factory pre-wiring of the electrical cabinet facilitates making the electrical connections between the inverter and the electrical panel within the electrical cabinet.

The resulting apparatus and system provide an electrical cabinet pre-wired with complex electrical wiring to enable an installer to more easily install the photovoltaic system in a home.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 2A is a front, breakaway view of the electrical cabinet of FIG. 1, showing the interior volume of the electrical cabinet as it comes from the factory, including the distributed energy resources compartment pre-wired to the solar circuit breaker, to enable an installer to connect a photovoltaic power source and battery to a solar inverter.

FIG. 2B is a back, breakaway view of the electrical cabinet of FIG. 2A, showing the distributed energy resources compartment as seen through an opening in the back plate of the electrical cabinet, to enable an installer to connect a photovoltaic power source and battery to a solar inverter.

FIG. 2C is a back view of the electrical cabinet of FIG. 2B, showing wall board covering the electrical cabinet and the distributed energy resources compartment, illustrating the location of fastener points for a solar inverter to be mounted on the wall board near or over the distributed energy resources compartment, to enable an installer to connect a photovoltaic power source and battery to the solar inverter.

FIG. 2D is a back view of the electrical cabinet of FIG. 2C, showing the solar inverter mounted on the wall board covering the electrical cabinet and the distributed energy resources compartment, to enable an installer to connect a photovoltaic power source and battery to the solar inverter.

FIG. 3C is a back view of the electrical cabinet of FIG. 3B, showing the distributed energy resources compartment as it appears when viewed through the opening in the back plate, prepared for the installer to connect to the photovoltaic power source and battery to the solar inverter.

FIG. 3D is a front, breakaway view of the interior of the electrical cabinet of FIG. 3C, showing the distributed energy resources compartment fastened to the back plate.

Figure 1:
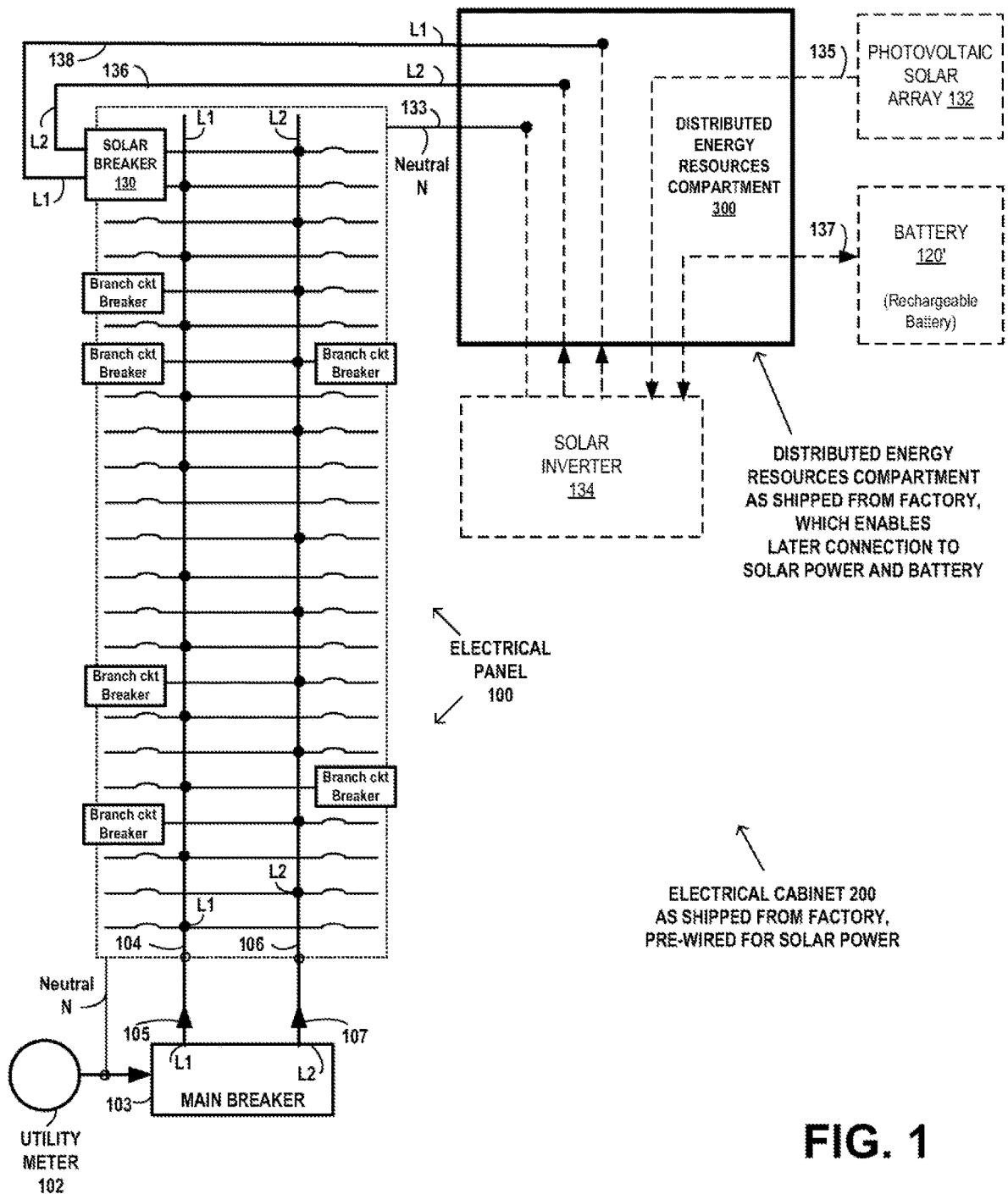
FIG. 1 is circuit and functional block diagram of an electrical cabinet as shipped from factory, which enables normal utility power and solar power. A distributed energy resources compartment enables later connection to solar power and battery.

The resulting apparatus and system provide an electrical cabinet pre-wired with complex electrical wiring to enable an installer to more easily install the photovoltaic system in a home.

Identical reference numerals have been used, where possible, to designate identical elements that are common to the figures. However, elements disclosed in one embodiment may be beneficially utilized on other embodiments without specific recitation.

DETAILED DESCRIPTION

FIG. 1 is circuit and functional block diagram of an electrical cabinet 200 (FIG. 2A) as shipped from the factory, which enables normal utility power and is pre-wired to enable future connection to solar photovoltaic power. A distributed energy resources compartment 300 (FIG. 2A, FIG. 3A) in the electrical cabinet 200 is pre-wired for later connection to a photovoltaic solar array 132, a rechargeable battery 120', and a solar inverter 134. FIG. 1 further illustrates an example of an electrical panel 100 with a solar circuit breaker 130 that is pre-wired to connect to the distributed energy resources compartment 300.

In accordance with an example embodiment, a main incoming circuit breaker 103 is connected to an electric power utility meter 102 that provides 120/240 VAC split phase electrical power for distribution by the electrical panel 100 to branch circuits of the residence. The utility supplies two 120 VAC phases L1 and L2 that are 180° out of phase with each other (split phases), and a grounded neutral voltage N. The main incoming circuit breaker 103 may be connected to the L1 leg and the L2 leg of the split-phase electrical power, and the grounded neutral voltage N may be connected to a neutral terminal of the electrical panel 100. The main incoming circuit breaker 103 may have an example rating of 200 Amperes.

The first 120 VAC phase L1 is between the L1 leg and the grounded neutral N, the phase L1 and is connected from the main breaker 103 via line 105 to bus bar 104 of the electrical panel. The second 120 VAC phase L2 is between the L2 leg and the grounded Neutral N, the phase L2 and is connected from the main breaker 103 via line 107 to bus bar 106 of the electrical panel. A 240 VAC service may be available between the Leg L1 and the Leg L2 of the split-phase electrical power. The first bus bar 104 and the second bus bar 106 may each have an example bus bar rating of 225 Amperes.

After photovoltaic power has been installed in the residence, the solar inverter 134 receives direct current from the photovoltaic solar array 132 and outputs alternating current over lines 136 and 138 to the solar circuit breaker 130 in the electrical panel 100. The solar breaker 130 is a two-pole circuit breaker that may be oriented as a back feed breaker to connect the L1 bus bar 104 and the L2 bus bar 106 to the solar inverter 134. The solar inverter 134 outputs the AC power to the L1 bus bar 104 and the L2 bus bar 106 via the solar circuit breaker 130. The solar breaker 130 may have an example rating of 60 Amperes.

The first 120 VAC phase L1 line 138, the second 120 VAC phase L2 line 136, and the neutral N line 133 from the electrical panel 100 are pre-wired to a terminal block 308 (FIG. 3A) in the distributed energy resources compartment 300, as shipped from the factory. In embodiments, the line 133 may be a cable that includes one or more of a ground wire, sensor wires, and control wires that may also be pre-wired to the terminal block 308. At a later time, the photovoltaic solar array 132 may be connected via line 135, the rechargeable battery 120' may be connected via line 137, and the solar inverter 134 may be connected to the electrical panel 100 via the terminal blocks 308 and 308' (FIG. 3B) in the distributed energy resources compartment 300.

FIG. 2A is a front, breakaway view of the electrical cabinet 200 of FIG. 1, showing the interior volume of the electrical cabinet 200 as it comes from the factory, including the distributed energy resources compartment 300 pre-wired to the solar circuit breaker 130, to enable an installer to connect the photovoltaic power source 132 and battery 120' to the solar inverter 134.

Figure 2E:
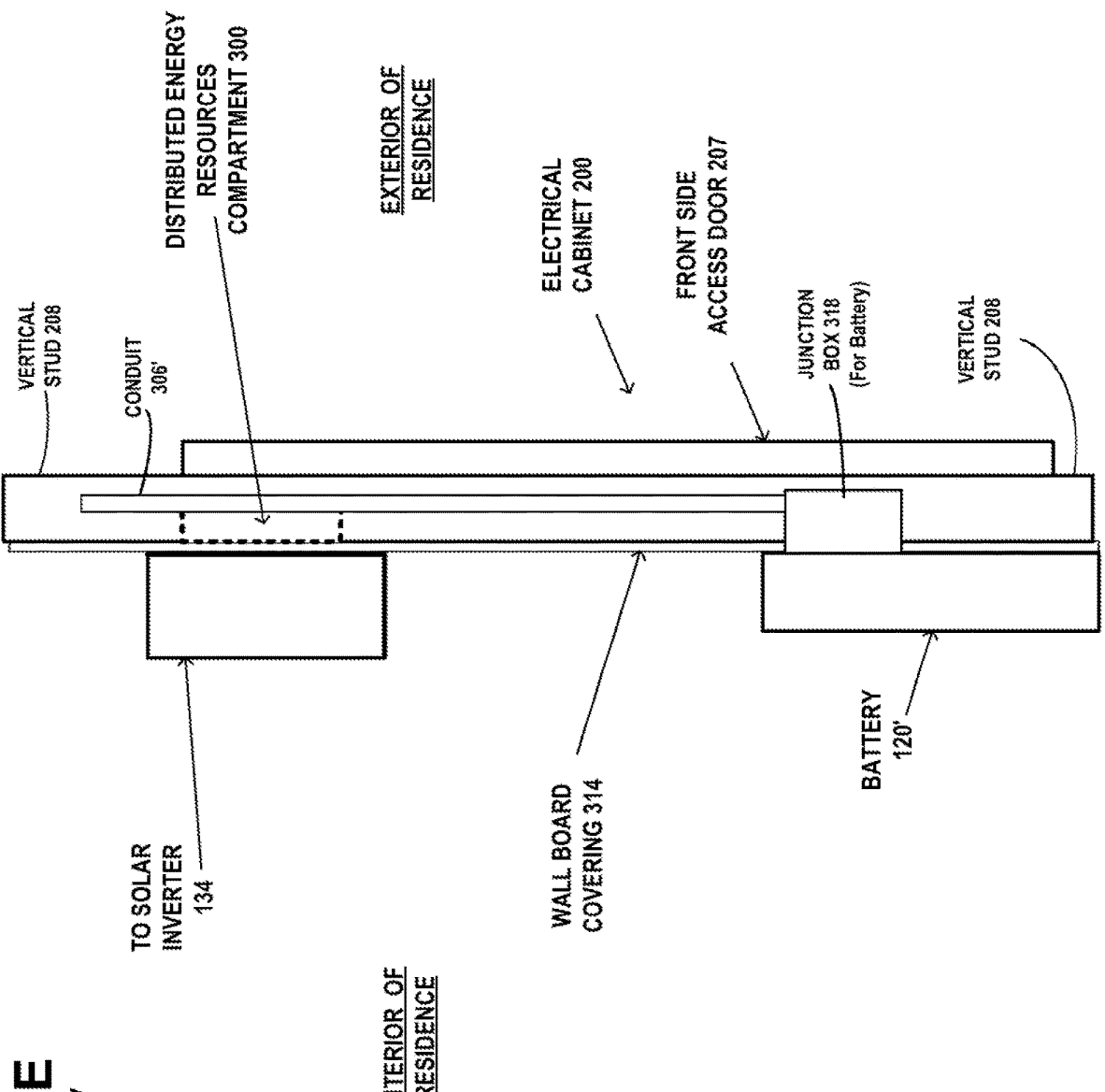
FIG. 2E is a side view of the electrical cabinet of FIG. 2D, showing the solar inverter mounted on the wall board covering the electrical cabinet and the distributed energy resources compartment, to enable an installer to connect a photovoltaic power source and battery to the solar inverter.

The electrical cabinet 200 is configured to fit between two adjacent vertical studs 208 separated by a horizontal width in a vertical wall of a residential structure. The cabinet 200 has a front side with an access door 207 (FIG. 2E), configured to extend beyond an exterior surface of the residential structure, a top side with a horizontal top wall 215, and a back side with a back plate 310 (FIG. 2B) facing toward an interior of the residential structure. The back plate 310 includes an open portion 312 (FIG. 2B). The back plate 310 is configured to be covered by an interior wall covering 314 (FIG. 2C) of the residential structure.

The electrical panel 100 is mounted within the electrical cabinet 200 and is configured to be powered by the utility power source 102 via the main breaker 103, by the photovoltaic power source 132, or by a combination of the utility power source and the photovoltaic power source.

The solar breaker 130 is shown mounted within the electrical cabinet 200 as a back-feed circuit breaker to the electrical panel 100, pre-wired with the phase L1 line 138 and phase L2 line 136 connected to the distributed energy resources compartment 300, as shipped from the factory. The neutral line 133 from the electrical panel 100 is pre-wired to the distributed energy resources compartment 300.

During construction of the residence, the electrical cabinet 200 is installed between the vertical studs 208 of the wall and conduits 306 and 306' are run within the wall to provide electrical connections to the photovoltaic power source 132 and a battery 120'. These conduits 306 and 306' may be run invisibly through the walls during construction, with conduit 306 running to the roof area for routing photovoltaic cables, and with conduit 306' invisibly running through the wall to a junction box 318 mounted conveniently nearby to the electrical cabinet 200 for future routing of wires to the battery 120'.

FIG. 2B is a back, breakaway view of the electrical cabinet 200 of FIG. 2A, as shipped from the factory. Fastener points 320 are located on the back plate 310 to fasten a cover plate 315 (FIG. 2C) over the opening 312, as shipped from the factory. The fastener points 320 may be threaded holes in the back plate 310 for fastening the cover plate 315 to the back plate 310. The cover plate 315 may be removed from the opening 312 by an installer when the solar inverter 134 is installed. FIG. 2B shows the distributed energy resources compartment 300, as seen through the opening 312 in the back plate 310 of the electrical cabinet 200, to enable the installer to connect the electrical panel 100, photovoltaic power source 132 and battery 120' to the solar inverter 134. The terminal blocks 308 and 308' (FIG. 3A) in the distributed energy resources compartment 300, may be seen through the opening 312. The opening 312 enables wires and cables to be fished through the conduits 306 and 306' to connect to the terminal blocks 308 and 308' (FIG. 3B).

The fastener points 316 located on the back plate 310 are for mounting the solar inverter 134 to the back plate 310. The fastener points 316 may be threaded holes in the back plate 310 for fastening the solar inverter 134 to the back plate 310. The back plate 310 will be covered by the wall board covering 314 (FIG. 2C). The installer may cut an opening (not shown) in the wall board covering 314 approximately the size of the opening 312 in the back plate 310, to expose the distributed energy resources compartment 300, enabling connection of wires from the solar inverter 134 to the terminal blocks 308 and 308. The solar inverter 134 may be mounted on the wall board covering 314 with screws pushed through the covering 314 into the threaded holes of the fastener points 316, overlapping the opening 312 in the back plate 310. If the installation of the photovoltaic system and solar inverter 134 is to be done later as a remodeling project, then the installer may cut an opening (not shown) in the wall board covering 314 approximately the size of the cover plate 315 fastened to the back plate 310, to remove the cover plate 315 so as to expose the distributed energy resources compartment 300. FIG. 2B shows the conduits 306 and 306' running through the wall and the junction box 318 mounted nearby to the electrical cabinet 200 for future routing of wires.

FIG. 2C is a back view of the electrical cabinet 200 of FIG. 2B, showing the wall board 314 covering the back plate 310 and covering the opening 312 in the back plate 310. The location of the fastener points 316 covered by the wall board 314 is shown, for the solar inverter 134 to be mounted on the wall board 314 over the opening 312 in the back plate 310. The location of the fastener points 320 covered by the wall board 314 is shown, for the cover plate 315. The cover plate 315 will have been removed from the opening 312 by the installer if the solar inverter 134 is being presently installed. Alternately, the cover plate 315 remains fastened to the back plate 310 if the solar inverter 134 is not being presently installed, and the dashed lines outline of the location of the cover plate 315 that is covered by the wall board covering 314.

FIG. 2D is a back view of the electrical cabinet 200 of FIG. 2C, showing the solar inverter 134 mounted on the wall board covering 314 of the electrical cabinet 200 and fastened at the fastener points 316 to the back plate 310. The battery 120' is shown connected by wires in the conduit 306' to the electrical cabinet 200.

FIG. 2E is a side view of the electrical cabinet 200 of FIG. 2D, showing the solar inverter 134 mounted on the wall board covering 314 of the wall in the interior of the residence. The position of the solar inverter may overlap the position of the distributed energy resources compartment 300. The cabinet 200 has a front side with an access door 207, configured to extend beyond an exterior surface in the exterior of the residence.

Figure 3A:
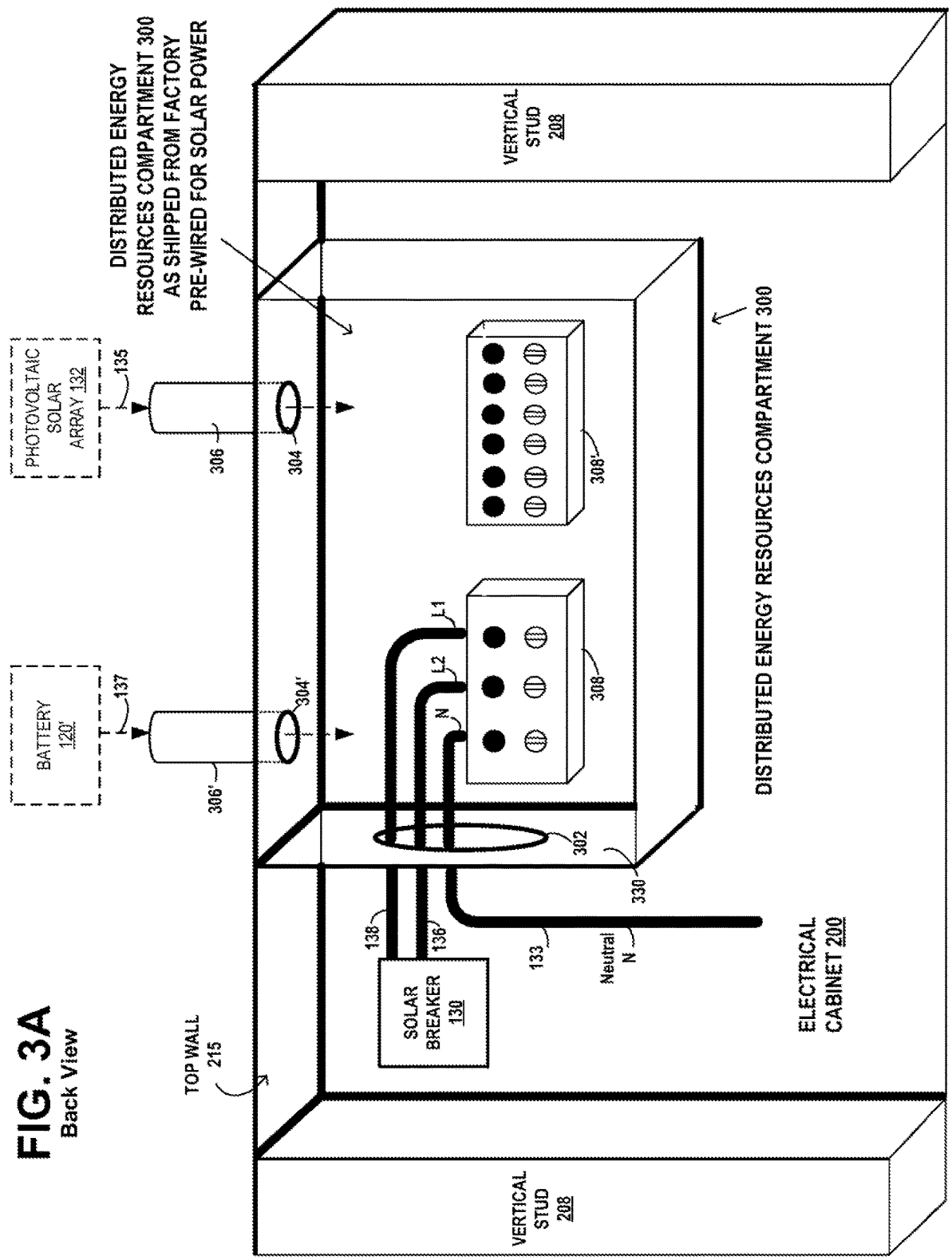
FIG. 3A is a back, breakaway view of the electrical cabinet of FIG. 2B, showing the distributed energy resources compartment as shipped from the factory, pre-wired to the solar circuit breaker and neutral wire to the electrical panel, to enable an installer to connect the photovoltaic power source and battery to the solar inverter.
Figure 3B:
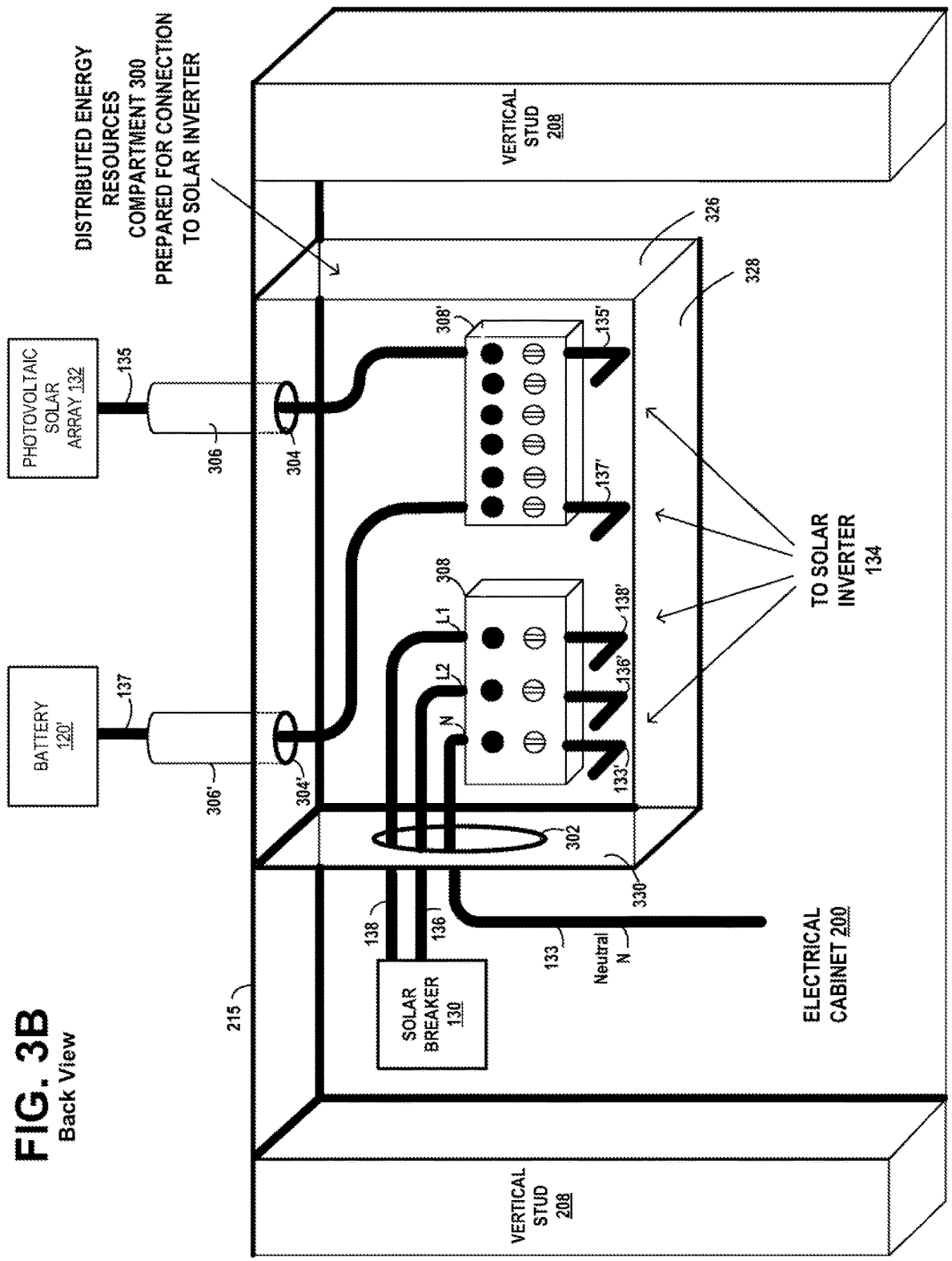
FIG. 3B is a back, breakaway view of the electrical cabinet of FIG. 3A, showing the distributed energy resources compartment, prepared for the installer to connect to the photovoltaic power source and battery to the solar inverter.

FIG. 3A is a back, breakaway view of the electrical cabinet 200 of FIG. 2B, showing the distributed energy resources compartment 300, as shipped from the factory, pre-wired to the solar circuit breaker 130 and the neutral N line 133 from the electrical panel 100. The distributed energy resources compartment 300 is mounted on the back plate 310 (FIG. 3D) of the electrical cabinet 200 within the interior volume of the electrical cabinet. The distributed energy resources compartment 300 is pre-wired with the phase L1 line 138 and the phase L2 line 136 to connect through opening 302 in the side wall 330 to the solar circuit breaker 130. The distributed energy resources compartment 300 is also pre-wired with the neutral wire 133 to connect through opening 302 in the side wall 330 to the electrical panel 100.

The distributed energy resources compartment 300 is open on its backside adjacent to the back plate 310 of the electrical cabinet 200 and is aligned with the open portion 312 of the back plate 310 of the electrical cabinet 200. The distributed energy resources compartment 300 is configured to receive connections from the solar inverter 134 through the open portion 312 of the back plate 310 when the solar inverter 134 is mounted on the wall board covering 314, to provide to the residence photovoltaic power via the distributed energy resources compartment 300, the solar circuit breaker 130, and the electrical panel 100.

The distributed energy resources compartment 300 is open on its topside adjacent to the horizontal top wall 215 of the electrical cabinet 200 and aligned with knockout portions 304 and 304' in the top wall 215 of the electrical cabinet 200. The knockout portions are configured to mechanically connect to respective conduits 306 and 306' to provide electrical connections within the distributed energy resources compartment 300, through the open topside of the distributed energy resources compartment 300, to the respective photovoltaic power source 132 and the battery 120'.

The first 120 VAC phase L1 line 138, the second 120 VAC phase L2 line 136, and the neutral line 133 from the electrical panel 100 are pre-wired to the terminal block 308 in the distributed energy resources compartment 300, as shipped from the factory. In embodiments, the line 133 may be a cable that includes one or more of the neutral N wire, a ground wire, sensor wires, and control wires that may also be pre-wired to the terminal block 308. At a later time (FIG. 3B), the photovoltaic solar array 132 may be connected via line 135, the rechargeable battery 120' may be connected via line 137, and the solar inverter 134 may be connected to the electrical panel 100 via the terminal blocks 308 and 308' in the distributed energy resources compartment 300.

FIG. 3B is a back, breakaway view of the electrical cabinet 200 of FIG. 3A, showing the distributed energy resources compartment 300, prepared for the installer to connect the first 120 VAC phase L1 line 138, the second 120 VAC phase L2 line 136, and the neutral line 133 from the terminal block 308 to the solar inverter 134, via the respective lines 138', 136', and 133'.

The installer may fish line 135 from the photovoltaic solar array 132, through the conduit 306 to connect to the terminal block 308', for connection to the solar inverter 134, via the line 135'. Line 135 may be a cable that comprises two DC wires, DC− and DC+, from the photovoltaic solar array 132. The installer may fish line 137 from the battery 120', through the conduit 306' to connect to the terminal block 308', for connection to the solar inverter 134, via the line 137'. Line 137 may be a cable that comprises two DC wires, DC− and DC+, from the battery 120'. In embodiments, the cables 135 and 137 may include one or more of a ground wire, sensor wires, and control wires that connect to the terminal block 308' for connection to the solar inverter 134.

FIG. 3C is a back view of the electrical cabinet 200 of FIG. 3B, showing the distributed energy resources compartment 300 as it appears when viewed through the opening 312 in the back plate 310, prepared for the installer to connect the electrical panel 100, the photovoltaic power source 132 and the battery 120' to the solar inverter 134. The distributed energy resources compartment 300 is open on its topside adjacent to the horizontal top wall 215 of the electrical cabinet 200. The conduits 306 and 306' provide electrical connections within the distributed energy resources compartment 300, through the open topside of the distributed energy resources compartment 300, to the respective photovoltaic power source 132 and the battery 120'. The fastener points 316 located on the back plate 310 may be threaded holes in the back plate 310 for fastening the solar inverter 134 to the back plate 310 with screws.

FIG. 3D is a front, breakaway view of the interior of the electrical cabinet 200 of FIG. 3C, showing the distributed energy resources compartment 300 fastened to the back plate 310. The distributed energy resources compartment 300 includes at least side walls 326 and 328 having flashing 324 that is fastened by screws, rivets, or welds to the back plate 310. The side wall 330 (shown in the rear view of FIG. 3A) having the opening 302 through which connections are made to the solar circuit breaker 130, faces away from the viewer in the front view of FIG. 3D.

In an alternate example embodiment, the distributed energy resources compartment 300 may be formed as an integral part of the electrical cabinet 200, having a top wall of the compartment 300 comprising part of a top wall 215 of the electrical cabinet 200.

In another alternate example embodiment, the distributed energy resources compartment 300 may be formed as an integral part of the electrical cabinet 200, with the opening on the backside of the compartment forming the opening 312 in the back plate 310 of the electrical cabinet 200.

In another alternate example embodiment, the distributed energy resources compartment 300 may comprise a top wall of the compartment 300 being parallel with the top wall 215 of the electrical cabinet, including at least first and second knockout portions configured to mechanically connect to respective first and second conduits 306 and 306' to provide electrical connections within the compartment 300 to the respective photovoltaic power source 132 and the battery 120'.

The resulting apparatus and system provide an electrical cabinet pre-wired with complex electrical wiring to enable an installer to more easily install the photovoltaic system in a home.

The resulting apparatus, system, and method facilitate connecting and integrating a photovoltaic power system in a home.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An apparatus for an electrical panel for a photovoltaic system for a residence, comprising:
    an electrical cabinet having an interior volume, configured to fit between two adjacent vertical studs separated by a horizontal width in a vertical wall of a residential structure, the cabinet having a front side with an access door configured to extend beyond an exterior surface of the residential structure, a top side with a horizontal top wall, and a back side with a back plate facing toward an interior of the residential structure, the back plate including an open portion, the back plate configured to be covered by an interior wall covering of the residential structure;
    an electrical panel mounted within the electrical cabinet, configured to be powered by a utility power source, by a solar inverter, or by a combination of the utility power source and the solar inverter;
    a solar circuit breaker mounted within the electrical cabinet, connected as a back-feed circuit breaker to the electrical panel; and
    a distributed energy resources compartment mounted on the back plate of the electrical cabinet within the interior volume of the electrical cabinet and configured to connect to the solar circuit breaker and to receive connections from the solar inverter through the open portion of the back plate of the electrical cabinet.

2. The apparatus of claim 1, wherein the distributed energy resources compartment further, comprises:
    the distributed energy resources compartment being open on a topside thereof adjacent to the horizontal top wall of the electrical cabinet and aligned with knockout portions in the top wall of the electrical cabinet, which include at least first and second knockout portions configured to mechanically connect to respective first and second conduits to provide electrical connections within the distributed energy resources compartment, through the open topside of the distributed energy resources compartment to a respective photovoltaic power source and a battery.

3. The apparatus of claim 1, further comprising:
    a terminal block mounted in the distributed energy resources compartment, pre-wired to the electrical panel and configured to make connections with the solar inverter, to conduct AC power between the solar inverter and the electrical panel.

4. The apparatus of claim 3, further comprising:
    a second terminal block mounted in the distributed energy resources compartment, configured to make connections with the solar inverter, to conduct DC power between the solar inverter the photovoltaic power source and the battery.

5. The apparatus of claim 1, wherein the distributed energy resources compartment is formed as an integral part of the electrical cabinet, having a top wall comprising part of the top wall of the electrical cabinet, including at least first and second knockout portions configured to mechanically connect to respective first and second conduits to provide electrical connections within the distributed energy resources compartment to a respective photovoltaic power source and a battery.

6. The apparatus of claim 1, wherein the distributed energy resources compartment is formed as an integral part of the electrical cabinet, with the opening on the backside of the distributed energy resources compartment forming an opening on the back plate of the electrical cabinet, configured to receive the connections from the solar inverter through the opening on the backside of the distributed energy resources compartment.

7. The apparatus of claim 1, wherein the distributed energy resources compartment further, comprises:
the distributed energy resources compartment having a top wall parallel with the top wall of the electrical cabinet, including at least first and second knockout portions configured to mechanically connect to respective first and second conduits to provide electrical connections within the distributed energy resources compartment to a respective photovoltaic power source and a battery.

8. A distributed energy resources compartment for an electrical panel for a photovoltaic system for a residence, comprising:
a compartment mounted on a back plate of an electrical cabinet within an interior volume of the electrical cabinet, wherein the compartment is configured to be connected to a solar circuit breaker mounted within the electrical cabinet, connected as a back-feed circuit breaker to an electrical panel; and
an opening on a backside of the compartment adjacent to the back plate of the electrical cabinet and aligned with an opening in the back plate of the electrical cabinet, configured to receive connections within the compartment from a solar inverter, through the opening in the back plate of the electrical cabinet, when the solar inverter is mounted to the back plate of the electrical cabinet.

9. The distributed energy resources compartment of claim 8, wherein the compartment further, comprises:
the compartment having an opening on a topside thereof adjacent to a horizontal top wall of the electrical cabinet and aligned with knockout portions in the top wall of the electrical cabinet, which include at least first and second knockout portions configured to mechanically connect to respective first and second conduits to provide electrical connections within the compartment through the opening on the topside of the compartment to a respective photovoltaic power source and a battery.

10. The distributed energy resources compartment of claim 8, wherein the compartment further, comprises:
a terminal block mounted in the compartment, pre-wired to the electrical panel and configured to make connections with the solar inverter, to conduct AC power between the solar inverter and the electrical panel.

11. The distributed energy resources compartment of claim 10, wherein the compartment further, comprises:
a second terminal block mounted in the compartment, configured to make connections with the solar inverter, to conduct DC power between the solar inverter, a photovoltaic power source, and a battery.

12. The distributed energy resources compartment of claim 8, wherein the compartment is formed as an integral part of the electrical cabinet, having a top wall of the compartment comprising part of a top wall of the electrical cabinet, including at least first and second knockout portions configured to mechanically connect to respective first and second conduits to provide electrical connections within the distributed energy resources compartment to a respective photovoltaic power source and a battery.

13. The distributed energy resources compartment of claim 8, wherein the compartment is formed as an integral part of the electrical cabinet, with the opening on the backside of the compartment forming the opening on the back plate of the electrical cabinet, configured to receive the connections from a solar inverter through the opening on the backside of the distributed energy resources compartment.

14. The distributed energy resources compartment of claim 8, further comprising:
a top wall of the compartment parallel with a top wall of the electrical cabinet, including at least first and second knockout portions configured to mechanically connect to respective first and second conduits to provide electrical connections within the compartment to a respective photovoltaic power source and a battery.

\* \* \* \* \*